Patented Aug. 7, 1945

2,381,814

UNITED STATES PATENT OFFICE 2,381,814

FLUID PRESSURE REMOTE CONTROL SYSTEM

Frederick Sydney Eves, Leamington Spa, England, assignor to Automotive Products Company Limited, Leamington Spa, England Application December 30, 1941, Serial No. 425,010
In Great Britain November 8, 1940

8 Claims. (Cl. 137—78)

This invention relates to fluid pressure remote control systems.

In some applications for which fluid pressure remote control systems are used, for example in the actuation of bulkhead doors of ships and the like, it is desirable that provision should be made for actuating a slave cylinder or other motor unit by pressure fluid, the supply of which is controlled from any one of a plurality of different positions. Thus in the case of a bulkhead door it is desirable that the opening and closing movement should be capable of being controlled either from a position adjacent the door or from a remote position, say on the usual bulkhead deck or perhaps from some other position, such as the bridge or the engine room. With this arrangement, however, it is desirable that fluid from one controlling means should not work in opposition to fluid being supplied to the motor unit from another controlling means, and it is the object of the present invention to provide an improved and simple arrangement for securing this result.

In a fluid pressure remote control system which is arranged so that pressure fluid can be fed to a motor unit through the medium of any one of a plurality of separate controlling devices, such as manually operable transmitter pumps, or valves controlling a main supply, the present invention is characterized by the fact that a collecting valve device receives pressure fluid for the motor unit and is arranged so that when certain of the controlling devices is or are operated, interlocking or equivalent means are rendered effective to prevent pressure fluid acting in a contrary sense being received simultaneously from another controlling device.

According to a further feature of the invention there is provided a fluid pressure remote control system having a motor unit which is arranged to be fed with fluid by alternative controlling devices, such as manually operable transmitter pumps, or valves controlling a main supply, wherein an interlocking valve device is provided in conjunction with the motor unit and comprises in combination a body, a plurality of valve members, corresponding respectively to the various controlling devices, and interlocking means which are actuated when pressure fluid is received from a certain one of the controlling devices, and which acts to render inoperative a valve member corresponding to another controlling device.

Further, according to the invention a fluid pressure remote control system may comprise in combination a motor unit, a supply of pressure fluid arranged to be connected with the motor unit by way of a control valve, a manually operable transmitter pump arranged to feed pressure fluid to the motor unit, and interlocking means arranged to isolate the motor unit from the pressure fluid supply whenever fluid is being fed to said unit from the said transmitter pump.

If desired the interlocking means may be arranged to render a transmitter pump inoperative by causing its output to be discharged freely, and in cases where the working fluid is a liquid, the pressure liquid transmitted by the transmitter pump may thus be caused by the interlocking means to be returned freely to a reservoir. In cases where the motor unit is double-acting and is actuated by a plurality of manually operable transmitter pumps, one of said pumps may have priority over another for only one direction of movement of the motor unit.

The interlocking means may comprise a valve device having, for each transmitter pump, an auxiliary control plunger which is moved axially by the pressure fluid received from the transmitter pump, such movement serving to place the said transmitter pump into communication with the motor unit; the axial movement of any auxiliary control plunger may be arranged to cause an internal main supply valve, which is interposed between the motor unit and the controlling means for a main supply, to be held in its "off" position. Each auxiliary control plunger may be slidable in a bore and may be formed with grooves which register with ports in said bore, a floating piston being interposed between the end wall of the bore and the auxiliary control plunger to provide a pair of working spaces which are connected by a pair of pipe lines to the corresponding transmitter pump, the arrangement being such that the auxiliary control plunger is moved axially in the same direction, irrespective of which working space is fed with pressure fluid. Preferably a by-pass valve is provided in the interlocking means and is opened by pressure fluid delivered from a predetermined transmitter pump when the latter is operated in a particular direction, said by-pass valve acting to render another transmitter pump inoperative in the event of said other pump being worked in a contrary sense to that movement of the predetermined transmitter pump which caused the by-pass valve to open.

The invention is illustrated by way of example in the accompanying drawings in its application to the liquid pressure actuation of a marine bulkhead door, and in these drawings, which are all diagrammatic:

Figure 1:
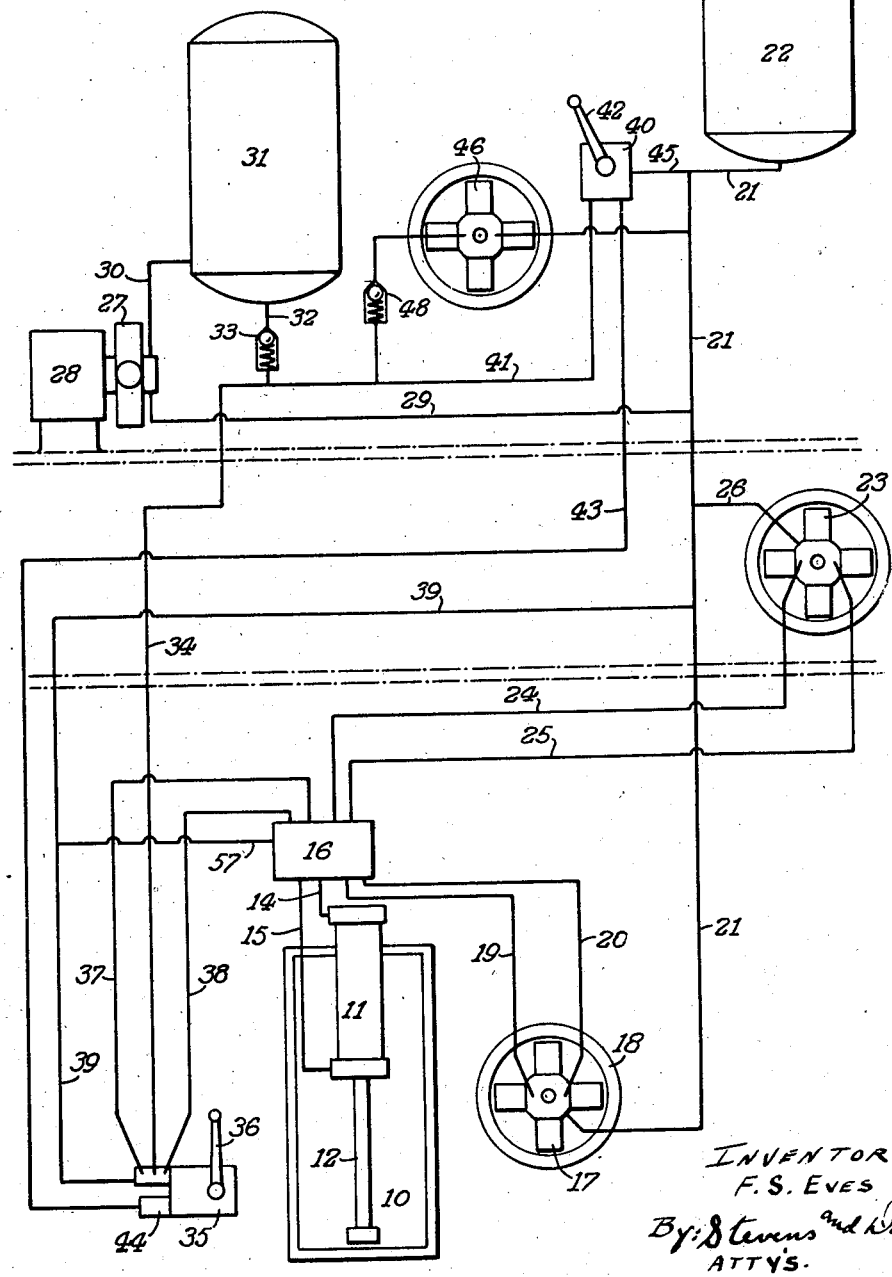
Figure 1 shows the various components and connections of the system.

In the system shown in Figure 1 the bulkhead door of a ship is indicated at 10, and is arranged to be raised and lowered by a double-acting motor cylinder unit 11, the plunger 12 of which has its lower end 13 secured to the door 10. The motor cylinder unit 11 is connected by a pair of interchangeable flow and return pipe lines 14 and 15 with an interlocking valve device which is indicated generally at 16 in Figure 1. The internal construction and working of this device will be described more fully hereinafter, but it can be stated that its function is to receive pressure liquid from any one of a plurality of sources and to conduct said pressure liquid to the motor unit 11, giving a predetermined priority to certain of said sources when more than one of them are supplying pressure liquid at the same time.

Thus in the example illustrated there is a locally disposed manually operable pump 17 having a rotatable hand wheel 18 and adapted to deliver pressure liquid through either one of a pair of pipe lines 19 and 20, depending upon the direction in which the handle 18 is turned, the liquid rejected by the double-acting motor unit 11 being, of course, returned through the other of the pipe lines 20 or 19. This pump 17 would normally be disposed adjacent the bulkhead door 10 and is herein termed "the local transmitter." Liquid replenishment takes place as required through a pipe 21 leading to the casing of the pump 17 from a liquid storage reservoir 22. A similar pump, herein termed "the deck transmitter," is indicated at 23 and is disposed at a more distant point, say on the bulkhead deck of the ship, said pump being connected by a pair of interchangeable flow and return pipe lines 24 and 25 with the interlocking valve device 16, while it is connected with the reservoir 22 by way of a pipe 26.

Provision is also made whereby the bulkhead door 10 can be operated by pressure liquid delivered from a pump 27 having a driving motor or engine indicated at 28. This pump receives liquid from the reservoir 22 by way of an inlet pipe 29 and feeds it through a delivery pipe 30 to a hydraulic accumulator 31. The outlet from the accumulator is shown at 32 and has a non-return valve 33, after passing which the liquid from the accumulator flows through a main supply pipe 34 to a control valve 35 disposed adjacent the bulkhead door 10. The control valve 35 has an operating handle 36 and is reversible, so that the supply of pressure liquid from the pipe 34 can be led to either one of a pair of interchangeable flow and return pipe lines 37 and 38 leading to the interlocking valve device 16. That one of these pipe lines which does not carry the pressure liquid, of course, receives the liquid rejected from the motor unit 11 and the control valve 35 conducts this rejected liquid to a pipe 39 which leads back to the reservoir 22. In the exemplary system shown in Figure 1 the control valve 35 is also adapted for distant actuation by hydraulic means, and for this purpose a selector valve 40 is located at any convenient part of the ship is fed with pressure liquid from the accumulator by way of a pipe 41, and when its operating handle 42 is moved to an appropriate position or positions this liquid at full or partial pressure is allowed to flow through a pipe 43 to a control cylinder 44 for correspondingly actuating the control valve 35. The selector valve 40 is connected at 45 with the reservoir 22. A manually operable stand-by pump 46 is provided for use when the pump 27 is not running and is arranged to receive liquid from the reservoir 22 through an inlet pipe 47 and to deliver said liquid under pressure through a non-return valve 48 into the main supply pipe 34. The stand-by pump 46 is of course non-reversible, the motor unit 11 being actuated in the desired direction by operating either the selector valve 40 or the control valve 35.

The interlocking valve device 16, the internal arrangement of which is shown diagrammatically in Figures 2 to 6, comprises a body 50 which is formed with four mutually parallel bores 51, 52, 53 and 54, these all leading into a space 55. The bores 53 and 54 open at their opposite ends into a space 56, which is in communication with the reservoir 22 by way of a connection 57a leading by a pipe 57 (see Figure 1) into the pipe 39.

Figure 2:
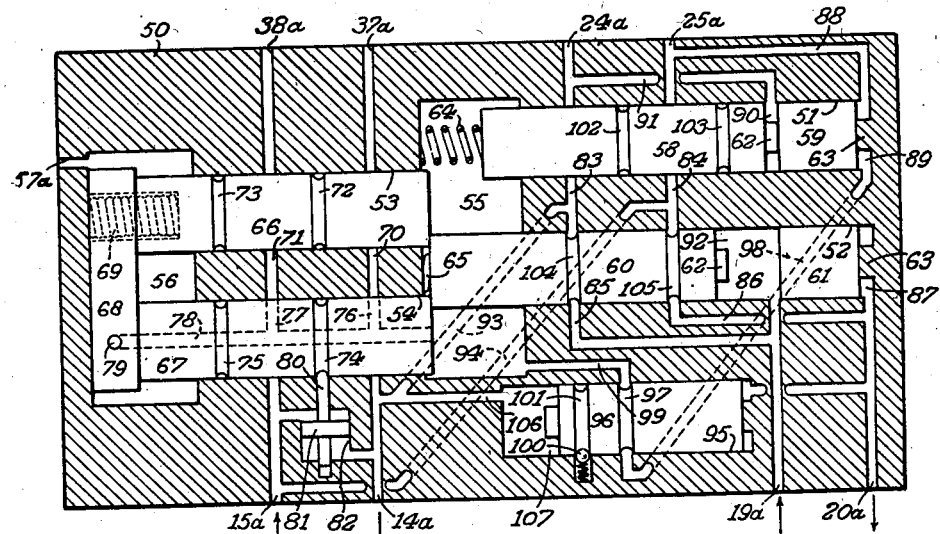
Figure 2 is a sectional representation of the internal arrangement of the interlocking valve device.
Figure 6:
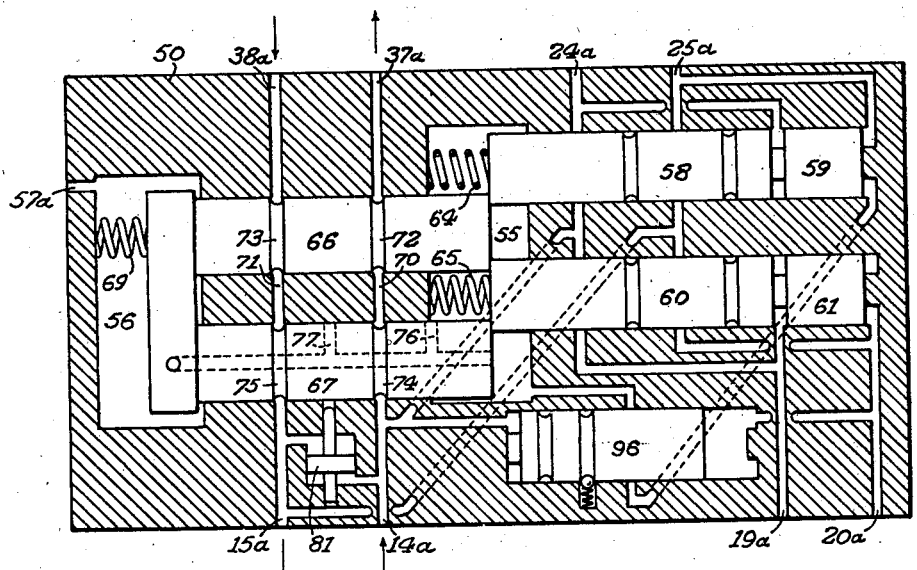

The bore 51 contains a first auxiliary control plunger 58 and a floating piston 59, while the bore 52 similarly accommodates a secondary auxiliary control plunger 60 and a corresponding floating piston 61, axial projections 62 being formed upon the ends of the auxiliary control plungers 58 and 60 and similar projections 63 being provided upon the end walls of the bores 51 and 52 to provide annular spaces between the parts when these are actually in engagement with one another. The auxiliary control plungers 58 and 60 are urged towards the right by coiled compression springs 64 and 65 respectively. The bores 53 and 54 house respectively a first main control plunger 66 and a second main control plunger 67, these parts being connected rigidly together by a strap fitting 68 and being urged, also towards the right, by a coiled compression spring 69 disposed within a recess formed in the main control plunger 66. It will be noted that the first and second auxiliary control plungers 58 and 60 are sufficiently close together to overlap and engage with the first main control plunger 66, so that when either of the plungers 58 or 60 is in its left-hand position the two main control plungers 66 and 67 must also be in their left-hand positions. The body is drilled with a pair of passages 37a and 38a, which are joined respectively to the pipes 37 and 38 shown in Figure 1, and which break into the bore 53, forming a pair of ports in the upper surface thereof. From the lower part of the bore 53 a pair of passages 70 and 71 extend in alignment as far as the upper part of the bore 54, while corresponding passages 14a and 15a lead from ports in the bottom part of the bore 54 and are connected with the pipe lines 14 and 15 respectively shown in Figure 1. The main control plunger 66 has two spaced circumferential grooves 72 and 73, and the main control plunger 67 has similar grooves 74 and 75, the arrangement being such that when the two plungers are in their right-hand position (as shown in Figure 6) a connection is established from the passage 37a to the passage 14a by way of the passage 70 and also from the passage 38a to the passage 15a by way of the passage 71. When, however, the main control plungers 66 and 67 are in their left-hand position, as shown in Figure 2, the passages 37a and 38a are blocked, but the passages 70 and 71 are connected together and to the space 56 by means of radial passages 76 and 77, which are formed in the plunger 67 and lead into a longitudinal passage 78. One end of the latter is in free communication with the space 55, while the other leads into the space 56 through a hole 79 in the strap fitting 68. A locking pin 80 formed integrally with a piston 81 sliding in a bore 82 is arranged, when raised, to engage with the second main control plunger 67, this action being brought about by the presence of pressure liquid in the passage 14a, which pressure liquid acts to lift the piston 81. Should the plunger 67 be in its lefthand position when the locking pin 80 is raised, the upper end of said pin will engage with the annular groove 74 and prevent movement of both plungers 67 and 66 towards the right.

The body 50 is also formed with a pair of passages 24a and 25a connected with the pipes 24 and 25 respectively, as shown in Figure 1, and leading into the upper part of the bore 51. Other passages 83 and 84 disposed in alignment with the passages 24a and 25a extend from the bottom of the bore 51 to the top of the bore 52, while from diametrically opposite positions at the bottom of said bore 52 passages 85 and 86 lead respectively to passages 19a and 20a for connection to the pipe lines 19 and 20. The auxiliary control plunger 58 is formed with a pair of spaced circumferential grooves 102 and 103, while the second auxiliary control plunger 60 has a similar pair of grooves 104 and 105. These grooves are so arranged that when the plunger is in its left-hand position they connect respectively with the passageways 83 and 84, thus joining these two passageways with the passages 24a and 25a in the case of the plunger 58 and with the passages 85 and 86 in the case of the lower plunger 60. It will be noted that the passage 20a leads into the space 87 between the floating piston 61 and the end wall of the bore 52, while in a similar way a passage 88, leading from the passage 25a, connects with the corresponding space 89 of the bore 51. Also when the floating piston 59 is in its right-hand position the space 90 between it and the auxiliary control plunger 58 is connected by a passage 91 with the passage 24a. Similarly the space 92 between the floating piston 61 and the auxiliary control plunger 60 is connected with the passage 19a. Form the connecting passages 83 and 84 passages 93 and 94, shown in dotted lines, lead to the passages 14a and 15a respectively.

A bore 95 formed in the body 50 and having its ends in communication respectively with the passage 14a and the passage 20a contains a by-pass valve plunger 96, which is actuated by liquid pressure and has a circumferential groove 97 adapted to connect the space 89 with the reservoir connection 57a, as shown in Figure 2, this connection taking place by way of a passage 98 shown in dotted lines, a passage 99, the space 55, the passage 78, and the space 56. A spring-loaded ball 100 is adapted to engage with a circumferential groove 101 to lock the by-pass valve plunger 96 resiliently in this position, said ball 100 being arranged to co-operate similarly with the groove 97 when the by-pass valve plunger 96 is in its opposite or "off" position, as seen in Figure 3.

When the door transmitter 17 is actuated in the appropriate direction for closing the bulkhead door 10 it delivers pressure liquid into the pipe line 19 and the parts of the interlocking valve device 16 are caused to assume the positions shown in Figure 2. The pressure liquid entering the space 92 pushes the auxiliary control plunger 60 to the left, thus enabling the circumferential groove 104 to transmit the pressure liquid to the passage 14a by way of the passage 93, the pressure liquid at the same time entering the bore 82 below the piston 81 and lifting the latter so that the locking pin 80 is raised into locking engagement with the main control plunger 67. The pressure liquid, of course, passes from the passage 14a into the pipe line 14 and the motor unit 11, forcing down the plunger 12 and closing the door; at the same time liquid rejected by the motor unit passes through the pipe line 15 into the passage 15a and thence by way of passage 94, circumferential groove 105, passage 86, and passage 20a to the prevailing return pipe line 20 of the door transmitter 17. This is, of course, the operation for which priority is desired in the present installation and it may be remarked that certain precautions are taken to prevent the adverse operation of the other controlling means, as will be hereinafter explained.

Figure 3:
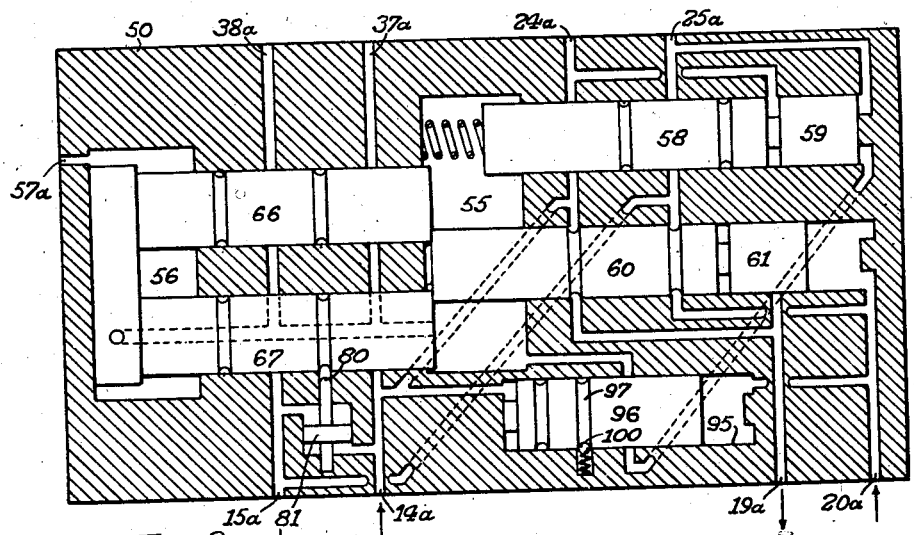
Figures 3 to 6 are views similar to Figure 2 but showing the parts in different working positions.

When the direction of rotation of the door transmitter 17 is reversed so as to open the door 10, the parts are caused to take up the positions shown in Figure 3. It will be seen that under these conditions the pressure liquid is admitted to the passage 20a and therefore forces the floating piston 61 to the left, this in turn pushing open the auxiliary control plunger 60, so that once again the passages 20a and 19a are placed into communication respectively with the passages 15a and 14a. The pressure liquid therefore issues from the passage 15a and passes to the bottom of the motor unit 11 by way of the pipe line 15, the rejected liquid flowing along the pipe line 14, through the interlocking valve device 16, and back to the door transmitter 17 through the pipe line 19. During this action the locking pin 80 is, of course, lowered out of engagement with the main control plunger 67, but this is of no account, for both of the main control plungers 66 and 67 are held in their left-hand "off" positions by the pressure liquid acting upon the second auxiliary control plunger 60 through the medium of its floating piston 61.

Figure 4:
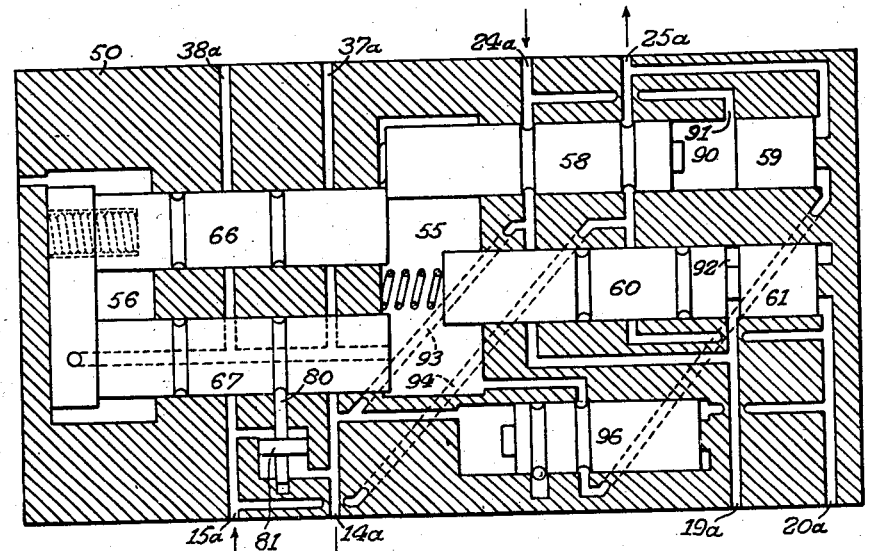

Figure 4 shows the arrangement of the parts when the deck transmitter 23 is actuated in the "door closing" direction, this causing pressure liquid to be fed into passage 24a. This liquid at first travels along the passage 91 into the space 90, forcing the first auxiliary control plunger 58 to the left and thus allowing the pressure liquid to flow by way of the circumferential groove 102 and the passage 93 to the passage 14a. The auxiliary control plunger 58 simultaneously places the passage 15a from the prevailing return pipe line 15 into communication with the passage 25a leading back to the deck transmitter 23 by way of the pipe line 25. As before, the main control plungers 66 and 67 are held in their left-hand "off" positions by the auxiliary control plunger 58, and they are in fact positively held by the action of the locking pin 80.

Figure 5:
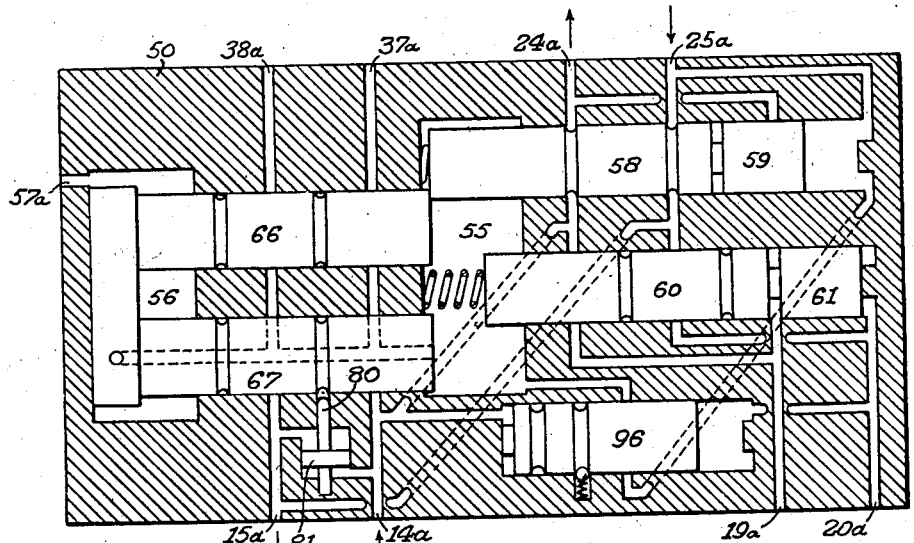

When the deck transmitter 23 is actuated in the opposite direction to open the door, the parts of the interlocking valve device take up the positions shown in Figure 5. The first auxiliary control plunger 58 is again moved to the left, but this time by the action of the pressure liquid upon the corresponding floating piston 59, said pressure liquid being admitted to the space 89 by way of the passage 88. Thus the pressure liquid can pass from the passage 25a to the passage 94 and out of passage 15a to the pipe line 15, the liquid rejected by the motor unit 11 being returned through the passages 14a, 93 and 24a.

Figure 6 shows the positions which the parts assume when the door transmitter 17 and the deck transmitter 23 are both inoperative, and under these conditions it is possible for the door 10 to be moved in either direction by the pressure liquid from the accumulator 31 (or from the standby pump 46). It will be seen that all the control plungers 66, 67, 58 and 60 are in their right-hand positions under the action of the springs 64, 65 and 69. Thus the passages 70 and 71 are isolated from the radial passages 76 and 77 in the plunger 67, but instead form, together with the grooves 72, 74 and 73, 75 respectively, connections between the passage 38a and the passage 15a and between the passage 37a and the passage 14a. Thus when the control valve 35 is moved to either of its "on" positions the pressure liquid from the corresponding flow pipe line 37 or 38 can pass directly to the corresponding end of the motor unit 11, thus actuating the door 10 in the desired direction.

Reverting to the question of priority, it will be seen firstly that both of the manually operated transmitter pumps 17 and 23 are able to supersede the power supply, for actuation of either of the transmitter pumps 17 or 23 in any direction causes the main control plungers 66 and 67 to be moved to the left, thus isolating the motor unit 11 from the accumulator 31. Secondly when the door transmitter 17 is operated in its "door closing" direction it has priority over the deck transmitter 23 in the event of the latter being actuated simultaneously in a contrary direction, i. e. in the "door opening" direction, and this will be clear by reference to Figure 2. The main control plungers 66 and 67 are held in their "off" positions by the locking pin 80, and in addition some of the liquid passing through the passage 93 flows through a passage 106 into the space 107 at the left-hand end of the bore 95, thus forcing the by-pass plunger 96 to its right-hand position, as shown. As above described, this places the passage 25a into direct communication with the reservoir 22, so that if the deck transmitter 23 is operated in the "door opening" direction the pressure liquid which it delivers to the interlocking valve device 16 is returned to the reservoir and cannot reach the motor unit 11. On the other hand, if the deck transmitter 23 is operated in the "door closing" direction its delivery passes into the passage 24a, thus shifting the auxiliary control plunger 58 to the left and augmenting the action of the door transmitter 17.

It will be appreciated that the improved systems can be used for numerous purposes and that the construction described is given merely as an example; various modifications are possible both in the arrangement of the system and in the design of the interlocking valve device. Thus the latter may be arranged for use with more than three alternative controlling devices and the valves themselves may take various other forms. Further, the improved form of interlocking valve device is applicable to fluid systems utilising gas as the working medium.

What I claim is:

1. In a fluid pressure system, a valve body having a first port, a second port, a first passage therebetween, a first bore intercepting said passage, a second bore axially spaced from and substantially parallel to said first bore, a common chamber between the adjacent ends of said bores, a third port, a second passage between said third and second ports intercepted by said second bore, first and second independently movable piston valves in said first and second bores having cylindrical portions for closing said passages, respectively, said valves having radially overlapping end portions adapted to abut one another, said valves having channels thereacross for opening said passages, means for biasing said first valve open, means for biasing said second valve closed, means for opening said second valve in response to fluid pressure in said third port, the total axial length of said valves between said channels when the valves are in abutment being greater than the corresponding distance between said passages, whereby, when said second valve is opened, to close the first valve, and independently operable means for supplying fluid to said first and third ports.

2. A fluid system for supplying and exhausting the opposite sides of a fluid-actuated motor, comprising a pair of independent fluid pressure means each having two ports and so constructed and arranged that either a region of high pressure or a region of low pressure may be present at one of the ports while the reverse condition of pressure is present at the other port, a valve device having two pairs of ports each of the pairs of ports communicating respectively with the ports of one of said independent fluid pressure means and a pair of passages adapted for connection to the fluid actuated motor, one passage of which is adapted to discharge fluid from the valve device while the other is adapted to admit fluid to the valve device, members in said valve device, each of said members being associated, respectively, with one of said pairs of valve ports and being biased to a normal position and movable therefrom in response to the application of pressure thereto solely from a separate one of said independent fluid pressure means, each of said members being provided with means for establishing communication between its associated pair of valve ports and the pair of passages when so moved, and means responsive to such movement of a predetermined one of said members to effect the exhaust of any pressure acting on the other of said members in a manner tending to move said other member.

3. A fluid system for supplying and exhausting the opposite sides of a fluid-actuated motor, comprising a pair of independent fluid pressure means each having two ports and so constructed and arranged that either a region of high pressure or a region of low pressure may be present at one of the ports while the reverse condition of pressure is present at the other port, a valve device having two pairs of ports each of the pairs of ports communicating respectively with the ports of one of said independent fluid pressure means and a pair of passages adapted for connection to the fluid-actuated motor, one passage of which is adapted to discharge fluid from the valve device while the other is adapted to admit fluid to the valve device, movable means in said valve device associated with one of said pair of valve ports and having a normal position establishing communication through its associated valve ports between one of said independent fluid pressure means and said pair of passageways and a member in said valve device associated with said other pair of valve ports, said member being biased to a normal position and being movable therefrom in response to the application of pressure thereto from the other of said independent fluid pressure means to a position establishing communication through the associated pair of valve ports between said other independent fluid pressure means and said pair of passageways, a portion of said movable means in its normal position in said valve device lying in the path of movement of said movable member, whereby movement of said movable member away from normal position will cause displacement of said movable means in said valve body away from its normal position.

4. A fluid system for supplying and exhausting the opposite sides of a fluid-actuated motor, comprising three independent fluid pressure means each having two ports and so constructed and arranged that either a region of high pressure or a region of low pressure may be present at one of the ports while the reverse condition of pressure is present at the other port, a valve device having three pairs of ports each of the pairs of ports communicating respectively with the ports of one of said independent fluid pressure means and a pair of passages adapted for connection to the fluid-actuated motor, one passage of which is adapted to discharge fluid from the valve device while the other is adapted to admit fluid to the valve device, movable means in said valve device associated with the first of said pairs of valve ports and having a normal position establishing communication through associated valve ports between the first of said independent fluid pressure means and said pair of passageways, a first member also in said valve device and associated with the second of said pairs of valve ports, said first member being biased to a normal position and being movable therefrom in response to the application of pressure thereto from the second of said independent fluid pressure means to a position establishing communication through the associated pair of valve ports between said second independent fluid pressure means and said pair of passageways, a portion of said movable means in its normal position lying in the path of movement of said first movable member so that movement of the latter will cause displacement of the movable means from its normal position, a second movable member in said valve device associated with a third pair of said valve ports, said member being biased to a normal position and being movable therefrom in response to the application of pressure thereto from the third of said independent fluid pressure means to a position establishing communication through said third pair of ports between said third independent fluid pressure means and said pair of passageways, a portion of said movable means in its normal position also lying in the path of movement of said second movable member so that movement of said second movable member will also cause displacement of the movable means from its normal position, and means responsive to movement of a predetermined one of said movable members to effect the exhaust of any pressure acting on the other movable member in a manner tending to move it.

5. A fluid pressure supply system as claimed in claim 4 comprising further, means responsive to positive fluid pressure in one of the passageways of the pair, while the movable means is in displaced position for locking said movable means in displaced position.

6. A fluid system for supplying and exhausting the opposite sides of a fluid-actuated motor, comprising a pair of independent fluid pressure means each having two ports and so constructed and arranged that either a region of high pressure or a region of low pressure may be present at one of the ports while the reverse condition of pressure is present at the other port, a valve device having two pairs of ports each of the pairs of ports communicating respectively with one of said independent fluid pressure means and a pair of passages adapted for connection to the fluid-actuated motor, one passage of which is adapted to discharge fluid from the valve device while the other is adapted to admit fluid to the device, said valve device also having a pair of cylindrical bores therein, a grooved control plunger in each bore, a floating piston also in each bore between an end of the bore and the control plunger, resilient means normally biasing each plunger and the respective piston toward said end of the respective bore, first means establishing a passageway between one of the valve device ports of the first pair and one end of one of said floating pistons and between the other of the ports of said first pair and the other end of said one floating piston, second means establishing a passageway between one of the valve device ports of the second pair and one end of the other of said floating pistons and between the other of the ports of said second pair and the other end of said other floating piston, whereby pressure fluid may be supplied at the end of each floating piston adjacent the end of the bore to cause the piston to move the respective plunger from normal position to a displaced position or between the plunger and the respective piston to act directly on the plunger to move the same from normal position to a displaced position, means including a portion of said first passageway establishing means for establishing a connection between the first pair of valve device ports and said pair of passages through the grooves in one of said plungers when the latter is in displaced position, means including a portion of said second passageway establishing means for establishing a connection between the second pair of valve device ports and said pair of passages through the grooves of the other of said plungers when it is in displaced position, and means responsive to movement of a predetermined one of said plungers to displaced position to effect the exhaust of any pressure acting on the other of said plungers in a manner tending to move it away from normal position.

7. A fluid pressure supply system as claimed in claim 3 comprising further, means responsive to positive fluid pressure in one of the passageways of the pair, while the movable means is in displaced position for locking said movable means in said position of displacement.

8. A fluid pressure supply system as claimed in claim 4 in which the movable means in said valve device is comprised of a pair of mechanically interconnected plungers each of which in normal position lies in the path of movement of one of the movable members, whereby displacement of either plunger of the movable means results in displacement of both.

FREDERICK SYDNEY EVES.